(No Model.)
C. W. RAMSAY.
Process of Treating and Preserving Fermented and Fermentable Liquors.
No. 243,156.　　　　　　　　　Patented June 21, 1881.
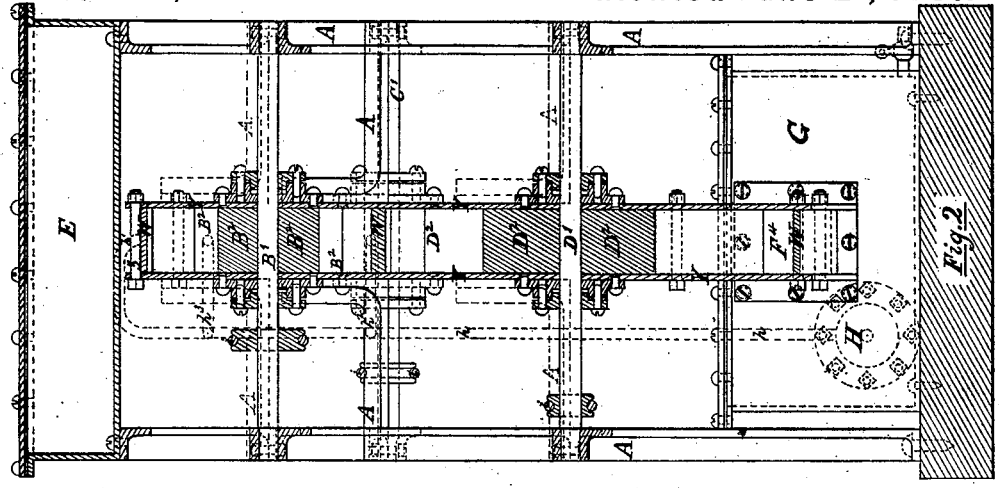
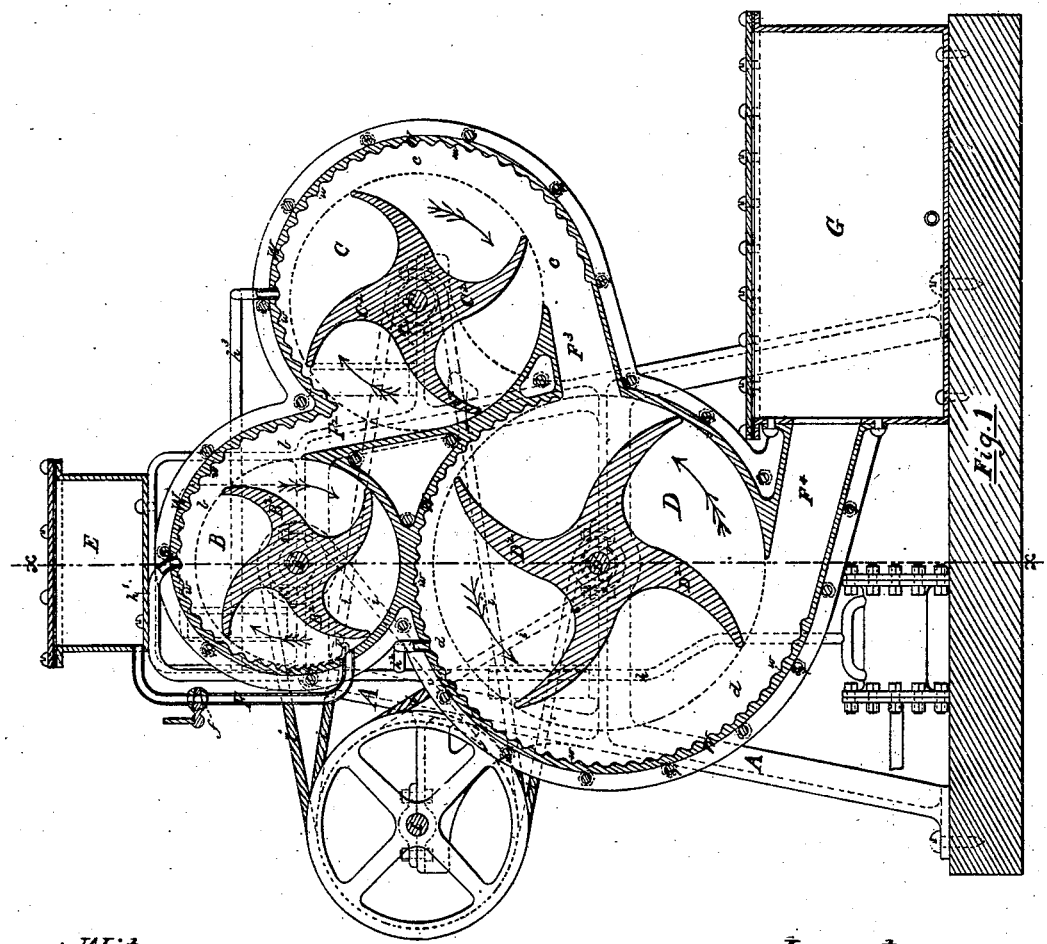
Witnesses　　　　　　　　　　　Inventor.

UNITED STATES PATENT OFFICE.

CHARLES W. RAMSAY, OF BROOKLYN, NEW YORK.

PROCESS OF TREATING AND PRESERVING FERMENTED AND FERMENTABLE LIQUORS.

SPECIFICATION forming part of Letters Patent No. 243,156, dated June 21, 1881.

Application filed February 3, 1881. (No model.)

*To all whom it may concern:*

Be it known that I, CHARLES W. RAMSAY, of the city of Brooklyn, county of Kings, and State of New York, have invented an Improved Process for Treating and Preserving Fermented and Fermentable Liquids, such as Wine, Cider, Beer, &c.; and I hereby declare the following to be a full and clear description thereof.

This invention relates to beer, cider, and other fermented and fermentable liquids.

The object of this invention is to prevent the deleterious fermentation or souring of such liquids. This subject has long occupied the attention of chemists, whose line of experiments has been conducted on the basis of the application of powerful acids used in the form of antiseptics. The germination of the torvula or yeast cell has been thereby temporarily arrested; but the presence of acid in the beer has proven so detrimental that brewers have been compelled to abandon such processes, and the only treatment which has met with any favor (and especially so in lager-beer) is what is generally known as the "Pasteur process." This process has consisted in bottling the liquids and then placing them in a suitable receiver, in which they are subjected to steam-heating until they reach a very high temperature, whereby the vitality or action of the torvula or yeast cell is temporarily arrested. This process has also injured, to a greater or less extent, the beer or other article to which it has been applied. It has therefore become desirable to devise means to destroy the torvula or yeast cell or other living organisms without injuring the article treated, and this I propose to do by the present invention, which consists in the process of preventing or arresting fermentation in beer and other fermented and fermentable liquids by first vaporizing or atomizing such liquids, and then subjecting them, while in the vaporous or atomic state, to violent shocks or concussions, whereby the infusoria and other living organisms which induce fermentation are destroyed.

I do not in this specification limit myself to any particular machine or apparatus for carrying out my invention; but I will describe a form of apparatus which I have employed with success, and for which I have made separate application for Letters Patent. This apparatus is illustrated in the accompanying drawings.

Figure 1 is a central sectional elevation of the machine, taken diametrically through all of the helical chambers and their rotary drivers or beaters. Fig. 2 is a transverse sectional elevation of the same parts shown in Fig. 1, this view being taken on the dotted line $x\,x$ of Fig. 1.

A A represent a supporting-frame for the machine, which frame may be made in any desired or convenient form. Conveniently attached to and supported by this frame is a set of converting or treating chambers, B C D. There should preferably be two or more of these chambers; but for ordinary use I prefer to employ three of them, as I have shown. These chambers have helical or nearly helical sides W, as shown in Fig. 1, and straight parallel ends $y$, as shown in Fig. 2, the ends being tightly fitted to the side or curved plates, so as to form perfectly tight connections between these parts, which are to be secured together, either by stud-bolts, securing each end respectively to the curved side plates, or by through-bolts $z$, passing through both of the end plates and holding them firmly together and to the intervening side plate, as shown in Fig. 2. There are driving-shafts $B'\,C'\,D'$ passing transversely through their respective chambers B C D, and provided with suitable bearings in the frame A A. To these shafts are respectively attached the rotary drivers or beaters $B^2\,C^2\,D^2$, the construction and operation of which will be presently explained.

The shafts $B'\,C'\,D'$ are placed eccentrically across the chambers B C D, to which they respectively belong, as is clearly shown in Fig. 1, so as to bring the side of the rotary drivers or beaters (in each case) nearest the inlet side of its chamber, thus allowing an increased amount of room on the opposite or outlet side of each set of drivers or beaters for the accommodation of the increased and increasing volume of the article under treatment as it assumes the attenuated or gaseous or vaporous form. This increase of the vaporous or gaseous cavity from the induction toward the eduction ports of the various chambers of this apparatus is clearly shown in Fig. 1, and the said cavities or sub-chambers are represented in the said Fig. 1 by the supplementary letters *b c d*, wherein it is not only shown that each of these vapor-cavities increases in size from the inlet end toward the outlet end, but also that the second cavity or sub-chamber, *c*, is larger than the one *b*, and the next one, *d*, is larger than the one *c* which precedes it. This arrangement will be found advantageous to adhere to in the construction of the apparatus, whether two or more of the converting-chambers are employed. This increase of size will preferably apply to the construction of the apparatus—*i. e.*, increasing dimensions of the vaporous or gaseous cavities or sub-chambers should exist in the apparatus to allow for the expansion of the material under treatment, and this increase of size will belong to each separate cavity or sub-chamber, and also to the sectional area of the whole set of chambers taken as a whole.

The interior side of the curved plate W of each of the chambers B C D, from a point contiguous to the inlet or induction port to a point contiguous to the outlet or eduction port, (measured in the direction of the rotation of the drivers or beaters,) will be corrugated, the said corrugations being represented by the letter *w* in Fig. 1.

The drivers or beaters $B^2$ $C^2$ $D^2$ preferably consist of two or more curved arms, attached to or cast solidly with the hub-piece belonging thereto, each of the said hubs to be neatly fitted on and secured to the shaft to which it belongs, as shown in Fig. 1. Some effect, though not to so advantageous an extent, may be produced if these arms are straight; but I prefer the mode of construction described. The curvature of the arms of these drivers or beaters should be opposite the direction of their rotation. Of course it would be possible to use straight radial arms for this purpose; but they would be liable to gather a considerable amount of the fluid between them during their rotation, and so render ineffective to a considerable degree the centrifugal action of the machine. With the curved arms shown in the drawings the centrifugal action of the machine will be positive and certain; but if the arms were straight the effect might be to clog the machine.

An important element in the construction and operation of this apparatus is the construction and location of the ports or apertures through and from which the article treated is to be passed into and out of the converting or treating chambers. The material to be treated should be placed in a suitable tank or reservoir, E, which will for most or all purposes require to be tightly closed, except at its outlet-pipe F, through which the fluid to be treated will pass into the converting-chambers. The pipe F should be provided with a suitable stop-cock, *f*, to prevent or regulate the flow of the fluid into the apparatus, and this pipe will discharge itself through an aperture, F', into the first chamber, B', and an aperture or duct, $F^2$, connects the chamber C with the chamber D, and so on, should there be more than three of the converting-chambers, while the last duct or aperture, $F^4$, will lead from the last chamber of the series to the receiver or storage-reservoir G, where the vapor will be allowed to recondense into the form of fluid. As is clearly shown in Fig. 1, the inlet or duct F' is placed as nearly as practicable toward the bottom or lowest point of the first converting-chamber, B, and the aperture or duct $F^2$ leading from the first to the second chamber of the series is placed tangentially to the first converting-chamber, or as nearly so as practicable, and as far removed circumferentially from the inlet-duct F' as the combination of the different chambers will allow. This is for the purpose of utilizing as much of the corrugated surface *w* as possible, and this arrangement of the inlet and outlet ducts must apply as far as possible to each converting-chamber of the set, the important point being that each inlet shall be as near the bottom of its chamber as practicable, and each outlet placed tangentially, or nearly so, to its respective chamber, and as far removed circumferentially from its corresponding inlet as possible, so as to get the full benefit of the operating-surface *w*.

The first inlet or duct, F', being only required for the passage of fluid, need only be the size of the pipe to which it is attached; but the duct $F^2$, being for the passage of vaporized or partly vaporized material, will necessarily be larger than F', and the duct $F^3$, being for the passage of the same amount of material as $F^2$, but in a more rarefied form, must be larger than the duct $F^2$, and so on, and for the same reason the duct $F^4$ must be larger than the duct $F^3$.

Suitable stop-cocks may be attached to each of the cylinders or chambers to draw off any sedimentary deposit that may accumulate in them.

This apparatus must necessarily be very strongly constructed, and for most purposes will be best built of cast-iron and be copper or porcelain lined.

The method of operating my apparatus is very simply explained. The substance or fluid to be treated is fed into the first converting-chamber through the pipe F, and is driven around by the drivers or beaters $B^2$ against the smooth or corrugated surface of the chamber B, the material flying off from the rotary arms or beaters of $B^2$ in centrifugal lines with great force, and striking the corrugations *w* with such a violent impact as to destroy in the first chamber most of the infusorial or other germ life and in the successive chamber or chambers all of the germ life contained in the article treated. In each successive chamber after the first the rarefaction of the material will be increased and the shocks imparted will be more severe until the climax is reached in the last converting-chamber. This effect will be aided by reason of the gradually-increasing dimensions of the treating-chambers hereinbefore explained, and by the rotating of each successive set of drivers or beaters after the first more rapidly than the one preceding it. Thus about the proper speed for the first driver or beater, $B^2$, should be, say, fifteen hundred revolutions per minute, that for the driver or beater $C^2$ should be about two thousand revolutions per minute, and that for the driver or beater $D^2$ should be about twenty-five hundred revolutions per minute, and so on. This is, of course, only intended as a general guide as to the regulation of the proper speed of the respective drivers or beaters, and it may in either case be made more or less, as may be desired or best adapted to any particular work.

The drivers or beaters should preferably be rotated from a common driving-shaft, I, by means of suitable belts, $i$, or corresponding cog-gearing; but the mechanism should be so constructed as to rotate the drivers or beaters, as shown by the arrows in Fig. 1, against the current of fluid passing to them respectively. The object of this construction is to cause the drivers or beaters to move in a direction opposite to the current of fluid or vapor which strikes them, and thereby to cause this current of fluid or vapor to impinge with great violence upon the drivers or beaters, thus very greatly contributing to the production of the general result.

It is important that the apertures or ducts $F'$ $F^2$ $F^3$ should be located at as low a point as practicable in the chambers they are respectively intended to exhaust, and that the direction of their discharge shall be downwardly, as I have found it to be impracticable to discharge these cold vapors in any other direction than downwardly.

I am aware of the patents of S. C. Bruce, No. 86,640, dated February 9, 1869, No. 98,226, dated December 28, 1869, and No. 122,513, dated January 9, 1872, wherein it is proposed to spray liquors for the purpose of aging them upon rotary beaters in adjoining chambers.

Having thus made known my invention, I claim—

The process herein described of arresting or preventing fermentation in fermented or fermentable liquids by first vaporizing the liquid, and then subjecting it while in the vaporous state to violent shocks or concussions, substantially in the manner and for the purpose set forth.

CHARLES W. RAMSAY.

Witnesses:
 M. RANDOLPH,
 P. E. RAQUÉ.